United States Patent
Klein et al.

(10) Patent No.: US 11,987,940 B2
(45) Date of Patent: May 21, 2024

(54) CONSTRUCTION MACHINE, IN PARTICULAR GROUND COMPACTION MACHINE, SPECIFICALLY RUBBER-TIRED ROLLER, METHOD FOR OPERATING A CONSTRUCTION MACHINE, AND METHOD FOR MANUFACTURING A CONSTRUCTION MACHINE

(71) Applicant: BOMAG GmbH, Boppard (DE)

(72) Inventors: Thomas Klein, Wehr (DE); Thomas Haubrich, Godenroth (DE)

(73) Assignee: BOMAG GmbH, Boppard (DE)

( * ) Notice: Subject to any disclaimer, the term of this patent is extended or adjusted under 35 U.S.C. 154(b) by 1216 days.

(21) Appl. No.: 16/308,914

(22) PCT Filed: Jun. 13, 2017

(86) PCT No.: PCT/EP2017/000688
§ 371 (c)(1),
(2) Date: Jul. 22, 2020

(87) PCT Pub. No.: WO2017/215785
PCT Pub. Date: Dec. 21, 2017

(65) Prior Publication Data
US 2021/0131043 A1 May 6, 2021

(30) Foreign Application Priority Data

Jun. 13, 2016 (DE) .......................... 102016007169.9

(51) Int. Cl.
*E01C 19/27* (2006.01)
*B60J 1/14* (2006.01)
(Continued)

(52) U.S. Cl.
CPC ................. *E01C 19/27* (2013.01); *B60J 1/14* (2013.01); *B60J 5/047* (2013.01); *B60J 5/0487* (2013.01); *E01C 2301/30* (2013.01); *E02D 3/026* (2013.01)

(58) Field of Classification Search
CPC .... E01C 19/27; B60J 1/14; B60J 5/047; B60J 5/0487; E02D 3/026
(Continued)

(56) References Cited

U.S. PATENT DOCUMENTS 2,011,301 A * 8/1935 Robinson ................... B60J 1/14
454/134
3,844,671 A * 10/1974 Domenighetti ......... E01C 19/27
404/117
(Continued)

FOREIGN PATENT DOCUMENTS

DE 9308801 U1 9/1993
DE 20020088 U1 3/2001
(Continued)

OTHER PUBLICATIONS

German Patent and Trademark Office, Search Report, Application No. 10 2016 007 169.9, dated Jan. 18, 2017 (8 pages).
(Continued)

*Primary Examiner* — Raymond W Addie
(74) *Attorney, Agent, or Firm* — Wood Herron & Evans LLP

(57) ABSTRACT

The invention relates to a construction machine (1) with a machine frame (2), a driver cab (6) with a right and a left door-window unit (12) when viewed in a traveling direction (A) of the construction machine (1), wherein the door-window units (12) are adjustable between a closed and an open position, and with a drive engine (13) and front and rear traveling devices (4, 5). Essentially, the door-window (Continued)

units (12) can be opened in an opposite manner, in particular depending on the side of the machine frame (2) on which the front and rear traveling devices (4, 5) respectively sit flush with the machine frame (2). The invention is particularly relevant for ground compaction machines, in particular rubber-tired rollers. The invention further relates to a method for operating a construction machine (1) and a method for manufacturing a construction machine (1).

12 Claims, 3 Drawing Sheets

(51) Int. Cl.
  *B60J 5/04* (2006.01)
  *E02D 3/026* (2006.01)
(58) Field of Classification Search
  USPC ...... 404/83, 101, 111, 117, 118–132, 72, 75, 404/121–132
  See application file for complete search history.

(56) References Cited

U.S. PATENT DOCUMENTS

| | | | |
|---|---|---|---|
| 3,901,617 A * | 8/1975 | Herbst | E01C 19/233 404/124 |
| 5,664,909 A * | 9/1997 | Lindgren | E01C 19/26 180/326 |
| 7,004,275 B1 * | 2/2006 | Junga | E01C 19/26 180/327 |
| 2004/0062608 A1 | 4/2004 | Auf der Springe et al. | |
| 2009/0039678 A1 * | 2/2009 | Mees | B60J 5/047 296/190.11 |
| 2015/0167258 A1 | 6/2015 | Ries et al. | |
| 2016/0102438 A1 * | 4/2016 | Kreische | F16C 3/28 74/571.11 |

FOREIGN PATENT DOCUMENTS

| | | |
|---|---|---|
| DE | 102007014209 A1 | 9/2008 |
| DE | 202011104134 U1 | 12/2011 |
| DE | 102010033585 A1 | 2/2012 |
| EP | 1038530 A2 | 9/2000 |
| FR | 1038530 A | 9/1953 |

OTHER PUBLICATIONS

Wikipedia, Zundapp Janus, URL:https://de.wikipedia.org/wiki/Zundapp_Janus, retrieved on Jan. 18, 2017 (3 pages).

European Patent Office, International Search Report, Application No. PCT/EP2017/000688, dated Aug. 25, 2017 (6 pages).

* cited by examiner

CONSTRUCTION MACHINE, IN PARTICULAR GROUND COMPACTION MACHINE, SPECIFICALLY RUBBER-TIRED ROLLER, METHOD FOR OPERATING A CONSTRUCTION MACHINE, AND METHOD FOR MANUFACTURING A CONSTRUCTION MACHINE

CROSS-REFERENCE TO RELATED APPLICATION

This application is a submission under 35 U.S.C. § 371 of International Application No. PCT/EP2017/000688, filed Jun. 13, 2017, which claims priority to German Application No. 102016007169.9 filed Jun. 13, 2016, the disclosures of which are hereby expressly incorporated by reference herein in their entireties.

FIELD OF THE INVENTION

The present invention relates to a construction machine, in particular a ground compaction machine, specifically a rubber-tired roller, a method for operating a construction machine, as well as a method for manufacturing a construction machine.

BACKGROUND OF THE INVENTION

Construction machines, in particular, of the self-propelled type, frequently include a driver cab from which the construction machine is operated in working operation. The driver cab usually comprises a front window, a rear window, a roof, and, on the right and left sides of the construction machine when viewed in the traveling direction of the construction machine, sidewalls which frequently include a respective door-window unit. The indication of right and left is in this case based on a traveling direction of the construction machine, in particular a forward traveling direction. The door-window unit enables, on the one hand, access from outside into the driver cab and, on the other hand, side vision from inside the driver cab to the outside. As is known, the door-window units are adjustable between a closed and an open position. The invention also comprises door-window units which include a door element and a window element, wherein the window element may be surrounded by the door element in a frame-like manner or at least be configured so as to terminate with the door element on one side. Also, comprised are door-window units which do not enable relative movement between the door and the window. The door-window unit may be articulated to a frame of the driver cab and/or a part of the sidewall via suitable hinges, in particular swivel hinges, or other joints, including slip joints.

Generic construction machines are self-propelled and include to this end a drive engine, in particular a diesel engine. Further provided are front and rear traveling devices. The invention relates in particular to construction machines for ground compaction. The traveling devices comprise in particular rubber tires. The front traveling device refers to the one arranged at the front in a forward direction, and the rear traveling device relates to the traveling device arranged at the rear with respect to this forward direction. In the present context, such generic ground compaction machines are in particular so-called rubber-tired rollers or combination rollers. In the case of rubber-tired rollers the front and rear traveling devices each include a plurality of rubber tires, and in the case of combination rollers one traveling device includes rubber tires and the other traveling device includes at least one roller drum. Such rollers manufactured by the Applicant are known, for example, as Applicant's model designation BW 27 RH.

There are oftentimes working situations in which the driver needs to have particularly good vision from the operator platform to a machine side on the right or left in the traveling direction, for example, when the driver has to maneuver the construction machine as closely as possible past an obstacle or the like. This applies, in particular, to ground compaction machines when the ground close to an obstacle, for example a curb, is to be compacted. To improve the visibility, it has therefore become a common practice, in particular, in such situations that the driver adjusts the door-window unit, in particular at least the window element, to the open position to obtain an improved field of vision. To this end, he may, for example, also lean out of the open door-window unit. In this situation, however, parts of the driver cabin, such as door/window hinges or the open door-window unit or parts thereof, are oftentimes perceived as obstructive. The aforementioned construction machines, in particular rollers, are often operated in a reversing manner. This means that the machines frequently perform alternating forward and backward traversals over the underlying ground to be processed during operation to achieve the desired ground compaction. In this regard, however, the design of previously known driver cabins is perceived as dissatisfactory since the doors are usually configured so as to open in a same traveling direction, i.e., in the forward traveling direction or the backward traveling direction, on both sides. On at least one side of the construction machine, the field of vision out of the driver cabin is thus restricted for the driver by elements of the door-window unit, for example door hinges, etc. Moreover, when manufacturing the driver cabins, it is necessary in each case to manufacture and stock two different doors since the doors opening in one traveling direction are usually configured side-inverted with respect to one another.

Based on the prior art, one aspect of the present invention is therefore to provide a solution for increasing the operational comfort for the driver of the construction machine and at the same time ideally also simplifying the manufacturing process of the construction machine.

SUMMARY OF THE INVENTION

One aspect of the present invention is that the door-window unit of the right side and the door-window unit of the left side are adjustable from the closed position to the open position at least partially in opposite directions with respect to one another when viewed in a traveling direction. More specifically, this means that the door-window unit of one side can be opened in the traveling direction (in particular in the forward direction) and the door-window unit of the other side of the construction machine can be opened against this traveling direction (i.e., in particular against the forward direction, or in the backward direction). In the case of door-window units that swivel open, based on a horizontal center axis transverse to the forward direction of the machine, the swivel axis of the door-window unit is thus arranged at the driver cabin offset in the traveling direction on one side and offset against this traveling direction on the other side. From the point of view of the driver looking from the operator platform in a traveling direction, the swivel axis of the door-window unit on one side is thus arranged, relative to the driver, with an offset to the front in this traveling direction, and the door-window unit on the other side is thus arranged with an offset to the rear against this traveling direction, i.e., one door-window unit opens in the direction of this traveling direction and the other door-window unit opens against this traveling direction. This traveling direction may, as a reference direction, in particular be the forward direction of the machine. It is thus essential that a forward direction is defined, and it is not relevant here that the machine can also travel backwards and regularly alternates between forward and backward travel in operation. The opening movement in and against the respective traveling direction thus consists in the respective door-window unit being moved, for example pushed open or swiveled open, at least partially in, and on the other side against, the traveling direction, in particular the forward direction. This enables the driver to adjust the front part of the door-window unit on one side of the driver cabin out of his field of vision by opening the respective door-window unit towards the rear when viewed in the forward direction. On the opposite side of the driver cabin, by contrast, he can adjust the rear part of the door-window unit out of his field of vision by opening the respective door-window unit towards the front when viewed in the forward direction. Overall, this specific arrangement of the door-window units of the driver cabin thus creates a possibility during both forward travels as well as backward travels to open the door-window unit on one respective side of the construction machine such that it does not obstruct the driver's vision out of the driver cabin along the sides of the construction machine and onto the front or rear traveling devices. For each traveling direction (forward or backward), one side of the construction machine is thus available on which the driver can open the door-window unit such that it is removed from his field of vision onto the respective traveling device. According to an exemplary embodiment, the two door-window units on the sides of the machine both open equi-directionally with respect to a clockwise direction in a horizontal reference plane.

The specific mounting and articulation of the door-window unit to the remaining driver cabin may vary. The driver cabin may comprise vehicle pillars on both sides, and the door-window units may be each arranged at a vehicle pillar, the door-window unit on one side being arranged at a front vehicle pillar when viewed in a traveling direction, in particular a forward direction, and the door-window unit on the other side being arranged at a rear vehicle pillar when viewed in this traveling direction, in particular the forward direction. The vehicle pillars may act not only as a support structure but may in particular also serve for passenger protection, for example as a part of a cage structure (ROPS; roll-over protection structure). In this case, two respective vehicle pillars, which are spaced from one another in the traveling direction, in particular the forward direction, are frequently provided on the right side (with the line of vision in the forward direction) and on the left side. This thus comprises, on each side from the front to the rear, at least an A-pillar (foremost vehicle pillar in the forward direction) and a B-pillar (the vehicle pillar following the A-pillar in the forward direction) but may also include further vehicle pillars (C-pillar, etc.). The two door-window units are, according to one embodiment of the present invention, not supported, in particular hinged, at vehicle pillars at a same level (i.e., position transverse to a traveling direction in a horizontal reference plane), i.e., both respectively at an A-pillar or at a B-pillar or at a C-pillar, etc., but at different vehicle pillars with respect to the order, i.e., at vehicle pillars at different levels, for example at the A-pillar on the left side and at the B-pillar on the right side. Through this, the driver can open one door-window unit in the traveling direction, in particular the forward direction, and the other door-window unit against this traveling direction, in particular against the forward direction, in a comfortable manner.

As described above, a door-window unit may, besides an openable door, also include a window that can be opened relative to the door, i.e., adjusted independently of the latter. In one embodiment, the doors and/or windows of the two sides are arranged in a reverse manner with respect to one another as described above, wherein the door and the window of one side are preferably each arranged to open in the same direction.

The advantages of the present invention become particularly apparent in construction machines in which the front and rear traveling devices are arranged with an offset relative to one another transversely to the traveling direction. This is frequently the case in particular for ground compaction machines, in particular rubber-tired rollers and combination rollers. The offset arrangement of the front and rear traveling devices is to be understood such that the front and rear traveling devices have, on opposite sides with respect to one another, a respective zero side on which they sit, with one of their face sides, at least flush with one side of the machine frame or even protrude outward beyond the latter (i.e., to the side when viewed in the traveling direction). On the other side of the respective traveling device, the other face side is, on the other hand, frequently slightly offset towards the machine center. The machine center of the construction machine extends in the traveling direction of the construction machine and, in a horizontal reference plane, is at a same respective distance from the outermost points of the machine frame transversely to the traveling direction. Thus, this specifically means, for example, that the front traveling device is right-aligned and the rear traveling device is left-aligned with the machine frame (or vice versa), or, for example, that they respectively protrude beyond the machine frame on the front right side and the rear left side (or vice versa). On the other hand, the left side of the front traveling device and the right side of the rear traveling device are slightly offset with their respective face side towards the machine center. According to one embodiment of the present invention, the door-window units are now preferably arranged such that they can be opened in a direction away from the traveling device located on the respective zero side. This means, in other words, that the door-window units on the respective sides of the driver cabin can be opened on their side in a direction away from that traveling device on their side which is located on the zero side. From the operator platform, the open door-window unit is then respectively located behind the driver when looking at the respective zero-side traveling device. From the point of view of the driver, the opening gap created when opening the respective door-window unit, on the other hand, is located on that side which is located on the respective zero side. If, for example, the door-window units are configured to swivel, the swivel hinges of the respective door-window unit are respectively located on the side of the door-window unit facing away from the traveling device arranged on the zero side. The above discussions here respectively refer to the one door-window unit which is arranged on that side of the driver cabin on which the front or rear traveling device is arranged with its zero side. It is thus possible that the driver has optimum visibility of the zero side of the respective traveling device since he can move the door-window unit out of the field of vision onto this zero side on the respective side of the driver cabin on which the zero side of the respective traveling device is located. Thus, the construction machines according to one embodiment of the present invention differ from previous conventional construction machines in that the door-window units of the driver cabin on both sides cannot each be opened in the same traveling direction but in opposite directions with respect to one another, which is preferably additionally coordinated with the offset of the front and rear traveling devices.

It is generally possible to use various mechanisms to move door-window units between the closed and the open position. According to an exemplary embodiment, the door-window units are, however, mounted at a frame of the driver cabin, in particular a respective vehicle pillar, via a door hinge and can swivel about a swivel axis between their closed position and their open position. Corresponding door hinges are cost-effective and function extremely reliably. As a result of this arrangement according to one embodiment of the present invention, the two door-window units are thus swiveled from their closed position to the open position and vice versa equidirectionally with respect to a horizontal reference plane. The door-window unit on one side of the construction machine, in particular the right side, is thus articulated to the driver cabin at its rear edge region when viewed in the forward direction, and the door-window unit on the other side of the construction machine, in particular the left side, is articulated at its front edge region when viewed in the forward direction. The door-window unit on the left side is thus arranged at the driver cabin at another level with respect to a traveling direction of the construction machine (for example, at the front) than the door-window unit on the right side (for example, at the rear). The door-window unit is in this case articulated to either a frame part of the driver cabin or an edge region of a side wall of the driver cabin. The edge region in this case designates in particular a region of the side wall that extends, in a horizontal reference plane, from one end of the side wall up to the articulation point of the door-window unit across a maximum of 25%, in particular a maximum of 15%, of the maximum length of the side wall in a traveling direction.

The door-window unit thus designates an adjustable lateral closure of the driver cabin via which the driver cabin can be accessed. It is generally possible here that the door-window unit includes merely one door element, which is in particular rigid and in particular includes a transparent window pane. In an optimum configuration, however, the door-window unit comprises a door element and a window element which is adjustable separately. The window element can preferably be opened independently of the door element. The window element may in particular be, or at least comprise, a transparent pane. The window element can be brought, in particular swiveled, to an open position separately from the door element, in particular when the latter is in its closed position. It is thus possible for the driver to open the window element separately during working operation to improve the visibility even when the door is closed. Thus, where reference is made above to a door-window unit which is at least partially in an open position, this means in particular that either the entire door-window unit or only the window element of the door-window unit is in an open position. It has further proven to be advantageous in practice if the window element and the door element of one side of the construction machine, i.e., of one door-window unit, open equidirectionally. The adjusting movement of the door element and the window element from the closed position to the open position and vice versa thus preferably occurs equidirectionally, i.e., in a same direction of movement. This is particularly advantageous when the driver wants to enter or leave the driver cabin since he then has to move both elements in the same direction and not in a reverse manner.

This is achieved in particular when the door element and the window element are arranged such that they are each adjustable about a shared swivel axis on one side. The two elements are then each arranged at the driver cabin on one side thereof so as to be adjustable about a shared swivel axis which extends in particular essentially vertically. According to one embodiment of the present invention, the swivel axis of the door-window unit of one side of the driver cabin is then arranged at the side of the driver cabin with an offset to the front when viewed in a traveling direction, and the swivel axis of the door-window unit on the other side of the driver cabin is arranged with an offset to the rear in this traveling direction. The offset is in this case relative to the center of the extension of the driver cabin in the traveling direction of the construction machine.

The door-window units may be configured essentially symmetrical, in particular mirror-symmetrical, in particular, with respect to their outer contour. The outer contour refers to the outer edge of the door-window unit, in particular, around its largest lateral surface in terms of surface area. With respect to a flat side (side having the largest surface extension in essentially one plane, for example the external side in the installed state), the door-window unit is thus configured in particular such that a symmetry axis running parallel to its longitudinal extension is obtained. It is thus possible that the driver cabin with the door-window units has a nearly identical appearance on both sides, which is generally perceived as aesthetically advantageous, even though the door-window units open in a reverse manner with respect to one another. The mirror symmetry axis in this case extends vertically with respect to the door-window unit installed in the driver cabin. Normally, however, the symmetry does not comprise operating elements such as door handles and mounting devices such as, for example, the door hinges, which are required on only one side.

In one embodiment, the door-window units of the right side and the left side are further identical in construction. This enables simplified manufacturing as well as an advantageous reduction of the overall number of different components required for the fabrication of the construction machine. Due to the fact that the two door-window units on both sides of the driver cabin open in opposite directions with respect to one another when viewed in a traveling direction, it is possible, for example, that, from the point of view of the operator standing laterally in front of the driver cabin, the door-window unit opens in the same direction, for example, to the left, on both the right and the left side of the construction machine.

The door-window units of the right and the left side may be arranged at the driver cabin of the construction machine in a centrosymmetrical manner with respect to a horizontal reference plane. This means, in other words, that when mirrored about a mirror point, the two door-window units are constructed and arranged at the construction machine or the driver cabin in an identical manner with respect to a horizontal reference plane. The point symmetry may even imply a symmetrical arrangement across the entire vertical extension of the door-window units, so that both door-window units are arranged at the construction machine or the driver cabin so as to be axially symmetrical to one another about a vertical mirror axis.

The advantages of the present invention become particularly apparent in construction machines which on the one hand require reliable maneuvering along lateral obstacles and at the same time perform frequent changes between a forward and backward traveling direction in working operation. Such working conditions are found in particular with ground compaction machines, in particular rubber-tired rollers or combination rollers. A rubber-tired roller comprises as its traveling devices front and rear rubber tires via which the ground is compacted. A combination roller includes at least one drum and one or more rubber tires. Since there are frequent changes of the traveling direction and the machines regularly need to be maneuvered closely past obstacles, good vision from the driver cabin to the side of the machine is required particularly in these cases. Moreover, these machines frequently include the offset of the front and rear traveling devices described above, so that the present invention enables optimum visibility of the respective zero side of the front and rear traveling devices.

A further aspect of the present invention consists in a method for operating a construction machine, in particular a construction machine according to the aforesaid, wherein the construction machine includes a driver cabin with, when viewed in a traveling direction of the construction machine, a right and a left door-window unit which are each adjustable between a closed and an open position, and front and rear traveling devices which are arranged with an offset transverse to the traveling direction and each include a zero side towards opposite sides and, with one of their face sides, in particular, sit flush with one side of the machine frame, or protrude outward beyond the latter, on the respective zero side. According to one embodiment of the present invention, it is now intended that the door-window unit located on the respective zero side is adjusted to the open position against the current traveling direction both in the case of forward as well as backward travels of the construction machine. Depending on whether the construction machine is currently traveling forward or backward, the driver of the construction machine can thus open the door-window unit respectively located on the zero side against the current traveling direction. It is thus possible to obtain optimum visibility of the zero side of the respective traveling device for both forward travels as well as backward travels.

A further aspect of the present invention finally consists in a method for manufacturing a construction machine, in particular a construction machine according to the aforesaid. An aspect of this method according to one embodiment of the present invention is that the attachment of door-window units to a driver cabin is performed such that the door-window unit on one side opens in a traveling direction and the door-window unit on the other side opens against this traveling direction. It is thus possible to use door-window units that are identical in construction on both sides of the driver cabin.

BRIEF DESCRIPTION OF THE DRAWINGS

The present invention will be described in more detail below based on the embodiment examples shown in the figures. In the schematic figures.

Identical parts and parts acting in a like manner are designated by like reference numerals. Recurring parts are not designated separately in each figure.

DETAILED DESCRIPTION OF THE INVENTION

Figures 1, 2:
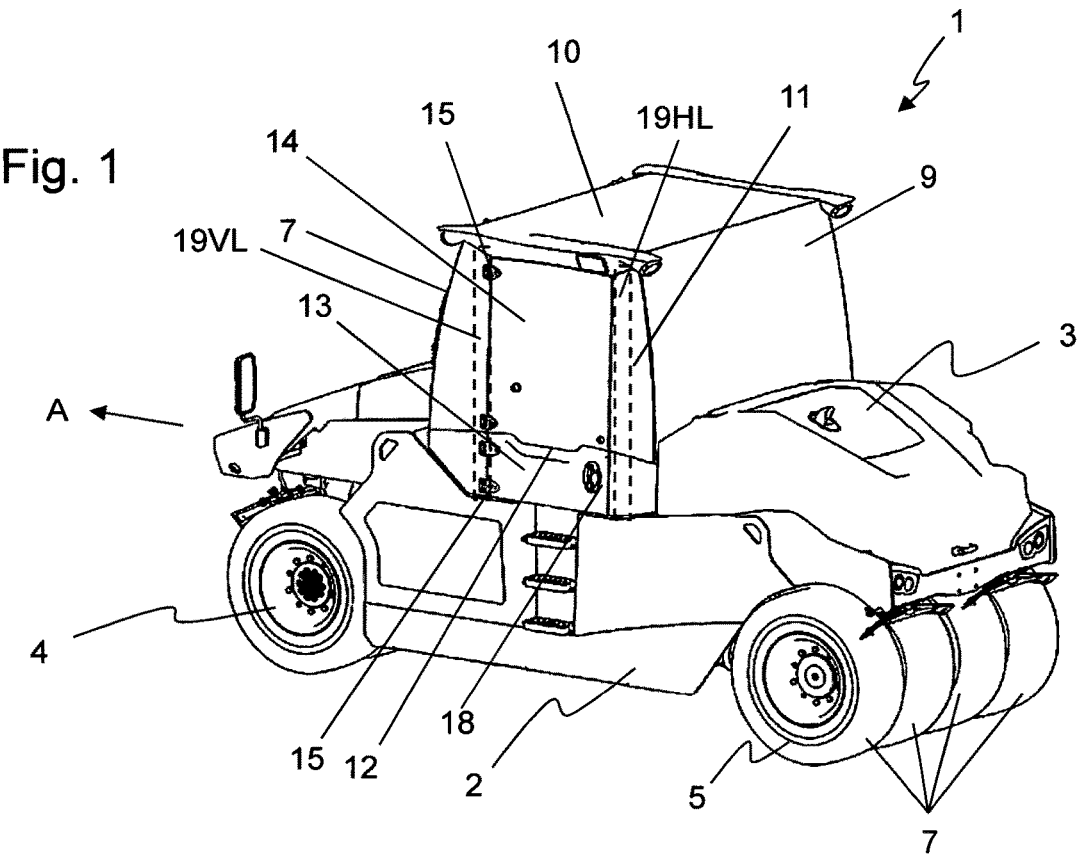
FIG. 1 is a perspective side view of a rubber-tired roller.
FIG. 2 is a top view of the rubber-tired roller of FIG. 1.
Figure 5:
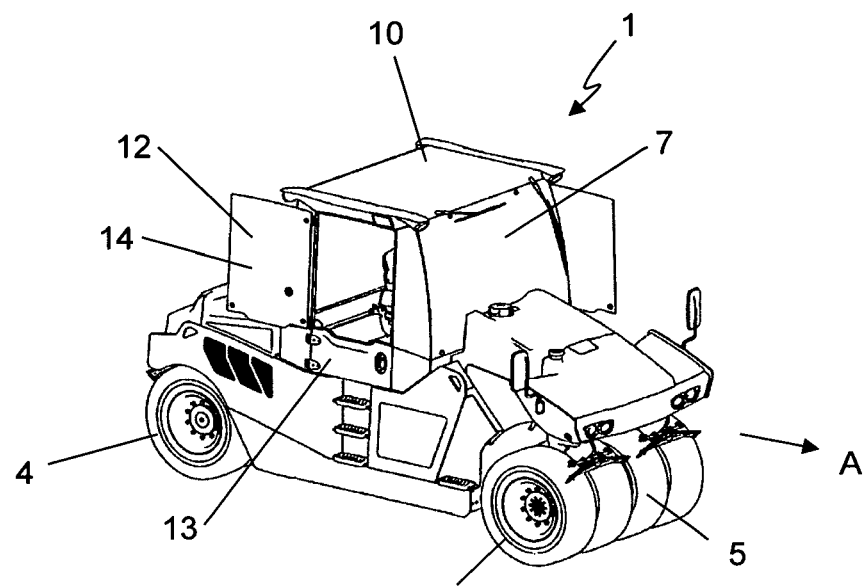
FIG. 5 is an oblique perspective view of the rubber-tired roller of FIG. 1 with open window element.

FIG. 1 shows an exemplary construction machine 1, specifically of the rubber-tired roller type. Elements of the exemplary construction machine 1 consist in a machine frame 2, a drive engine 3, specifically a diesel engine, front traveling devices 4 and rear traveling devices 5, and a driver cabin 6. The front and rear traveling devices 4 and 5 each comprise four individual rubber tires 7 which are in each case arranged coaxially and transversely to the forward direction A adjacent one another. Elements of the driver cabin 6 consist in a front pane 8, a rear pane 9, a roof 10, as well as a side wall 11 on the right and the left side of the construction machine 1 with respect to the forward direction A, each comprising a door-window unit 12. Each door-window unit 12 includes a door element 13 as well as a window element 14, which are each arranged so as to swivel separately relative to the remaining driver cabin 6 via swivel hinges 15. The swivel hinges connect the door-window unit 12 to a side region of the remaining sidewall 11, and thus at a location which is offset from an end of the sidewall 11 from the center of the sidewall 11 in the traveling direction. Said side region is more specifically a respective vehicle pillar 19 for articulating the swivel hinges, which is a part of the driver cabin 6 and together with other components forms a ROPS structure of the driver cabin 6. The two A-pillars are in this case designated with 19VL (front left vehicle pillar in the forward direction) and 19VR (front right vehicle pillar in the forward direction), and the two B-pillars are designated with 191-IL (rear left vehicle pillar in the forward direction) and 19HR (rear right vehicle pillar in the forward direction) (see, in particular, FIG. 2). The door-window units 12 can swivel between a closed position, as shown in FIG. 1, and an open position, as described in more detail below, in particular with reference to FIGS. 5 and 6. The traveling direction refers to a forward or backward travel of the construction machine 1, wherein the forward direction A is specifically designated in the figures (and the backward direction is accordingly the opposite direction).

Figure 3:
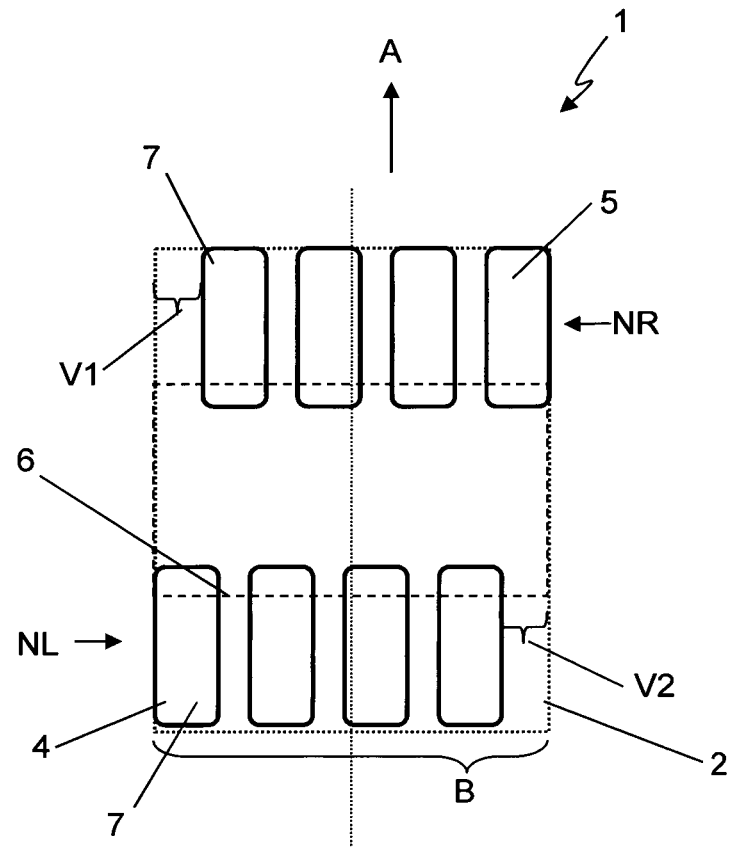
FIG. 3 is a schematic view showing the offset between the front and rear traveling units of the rubber-tired roller.

The front traveling device 5 and the rear traveling device 4 are arranged with an offset from one another with respect to the longitudinal center line M of the machine. This can be seen, for example, from the top view of FIG. 2. The longitudinal center line M of the machine is defined in the horizontal plane by a longitudinal line which has a same distance from the two outermost points of the construction machine 1 transversely to the working direction A, i.e., runs in the center of the width B of the construction machine 1 in the traveling direction, wherein adjusting elements or attached parts such as external mirrors, etc., are not taken into account for determining the longitudinal center line M of the machine. The decisive factor for this is the progression of the machine frame 2. FIG. 2 here illustrates that the far right rubber tire 7 of the front traveling device 5 at least sits flush with the machine frame 2 or even slightly protrudes laterally beyond the longitudinal edge of the machine frame 2. The front traveling device 5 thus has the zero side NR on this side. On the left side, on the other hand, the outer rubber tire is offset relative to the external side of the machine frame towards the longitudinal center line M of the machine (distance V1 in FIG. 3). In contrast to this, the far left rubber tire of the rear traveling device 4 at least sits flush with the machine frame 2 or even slightly protrudes laterally beyond the longitudinal edge of the machine frame there, thus forming the zero side NL there. Accordingly, the right rubber tire 7 of the rear traveling devices 4 is shifted inward towards the longitudinal center line M of the machine by the offset V2 (in FIG. 3). FIG. 3 illustrates this arrangement of the machine frame 2, the rear traveling device 4 and the front traveling device 5, as well as the driver cabin 6. The two opposed zero sides are thus at a distance from one another that corresponds to the machine width B, wherein the front and rear traveling devices 4, 5 may also protrude with their zero side laterally beyond the machine frame. The offset of the rear traveling devices 4 and the front traveling devices 5 relative to one another enables an optimized maneuvering of the construction machine 1 past obstacles since the driver of the construction machine 1 can respectively use the outer right or outer left zero side NL, NR from the driver cabin 6 for orientation to direct the machine from the operator platform 6.

Figure 4:
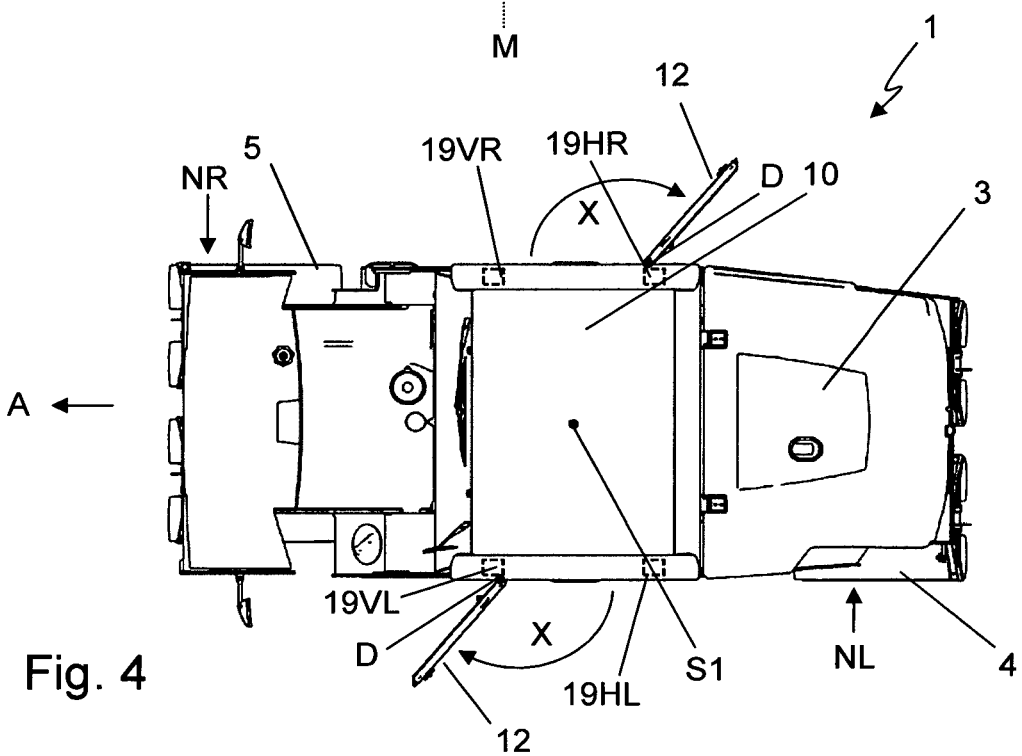
FIG. 4 shows the top view of FIG. 2 with the door-window units in an open position.

In order to prevent mounts of the door-window units 12 or the door-window units themselves from being perceived as obstructive when looking from the driver cabin at the respective zero side NR, NL, provision is now made for the door-window units 12 of both sides (right and left) of the construction machine 1 to be adjustable from their closed position to the open position in opposite directions with respect to one another when viewed in a traveling direction. In this regard, FIG. 4 shows the top view of FIG. 2 with each of the door-window units 12 in the open position. The opening movement of the door-window units 12 from the closed position to the respective open position is indicated by arrow X. The door-window units 12 in this case swivel about an essentially vertical swivel axis D. FIG. 4 illustrates that, when viewed in the forward direction A, the door-window unit 12 on the right side of the construction machine 1 is arranged at the driver cabin 6 so as to swivel out against the forward direction A, while the door-window unit 12 on the left side of the construction machine 1 is arranged so as to swivel out in the forward direction A. The opening side of the respective door-window unit 12, i.e., that side on which the door-window unit 12 is swiveled away from the remaining driver cabin, is thus arranged in the region of the driver cabin facing the respective zero side NR, NL when viewed in the traveling direction of the construction machine 1. Accordingly, the hinges 15 are respectively arranged at that part of the driver cabin 6 distant from the respective zero-side rubber-tire 7 when viewed in the traveling direction. For opening, the two door-window units 12 are thus moved away from the traveling device 4, 5 having its zero side NL, NR on the same side. This provides optimum visibility of the respective zero side NR, NL of the corresponding rubber tire 7 out of the driver cabin 6 for both the front traveling device 5 as well as the rear traveling device 4.

FIG. 4 further illustrates that the two opposed door-window units 12 are centrosymmetrical in a horizontal reference plane, i.e., are axially symmetrical about a symmetry axis S1 extending vertically in the approximate center of the driver cabin 6. This arrangement illustrates the mutually reverse arrangement of the two door-window units 12 in the traveling direction of the construction machine 1.

Essentially, all this is achieved in particular due to the fact that the two door-window units 12 are arranged, in particular hinged, at different vehicle pillars 19, i.e., at vehicle pillars 19 at different levels in a horizontal reference plane with respect to the forward direction A. This is illustrated in particular, for example, in FIG. 4. More specifically, the left door-window unit 12 is articulated, in particular hinged, at the A-pillar 19VL and thus swivels open in the forward direction A, whereas the right door-window unit 12 is arranged, in particular hinged, at the B-pillar 19HR (and not, as usual, at the same level at the vehicle pillar 19VR). In other words, the articulation point or rotation axis of the left door-window unit 12 is thus offset in the forward direction A from the center of the driver cabin to the front, whereas the rotation axis of the right door-window unit 12 is offset in the forward direction A from the center of the driver cabin to the rear. When viewed in the forward direction A, the rotation axes D are thus not at a same level but, due to their mounting at (for example) the A-pillar on the one hand and (for example) the B-pillar on the other hand, at different levels. In this regard, the present invention also comprises embodiments in which the doors are mounted at different vehicle pillars (C-pillar, D-pillar, etc.). In an exemplary embodiment, they are not articulated, in particular hinged, at vehicle pillars at a same level with respect to the order of arrangement A, B, etc.

In the present embodiment example, the door-window unit 12 comprises the door element 13 and the window element 14. The window element 14 can be adjusted from its closed position to its open position independently of the door element 13. This is further illustrated in FIG. 5, in which the window element 14 located on the right side of the construction machine 1 is in the open position swiveled open to the rear, and the door element 13 is still in the closed position. This positioning of the individual elements 13, 14 of the door-window unit 12 is particularly advantageous when the machine is in working operation and the driver wants to look out of the driver cabin at, in the present embodiment example, the front right rubber tire with the zero side NR. It is however preferred, in particular for entering and leaving the driver cabin 6, if the entire door-window unit 12 is adjusted to the open position, as is shown for the left door-window unit 12 in FIG. 6. It is ideal in this case if a coupling device, which is not shown in greater detail, is provided which is designed such that the door element 13 is prevented from being opened separately when the window element 14 is closed while it is at the same time possible to actuate both the door element 13 and the window element 14 via actuation of the door element 13. The door element 13 and the window element 14 further swivel about a shared swivel axis D, i.e., the swivel axes of the two elements are coaxial.

Figure 6:
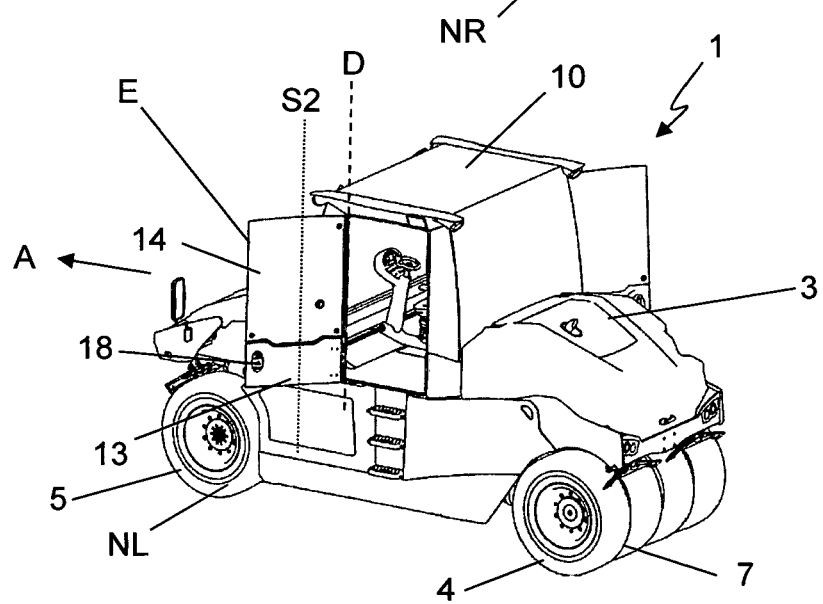
FIG. 6 is an oblique perspective view of the rubber-tired roller of FIG. 1 with open door-window unit.

In the present embodiment example, the door-window units 12 are designed mirror-symmetrical with respect to their outer contour, i.e., their edge E running around the external surface of the door-window unit 12. For further illustration in this regard, the corresponding mirror symmetry axis S2 is indicated in FIG. 6. This does not comprise actuation elements, such as a door handle 18, and mounting elements, such as the door hinges 15. The symmetrical configuration of the door-window unit 12 makes it possible to design the contour of the driver cabin 6 identical on both the right and the left side even though the door-window units 12 open in opposite directions, which is perceived as advantageous from an aesthetic point of view. Further, a door-window unit 12 which is identical in construction can be installed on both the right and the left side of the driver cabin 6, so that the component expenses for manufacturing the construction machine 1 can be reduced.

The configuration and arrangement principle of the door-window units 12 described above by means of the rubber-tired roller can also be transferred to other types of construction machines, such as combination rollers.

The offset of the rear traveling devices 4 and the front traveling devices 5 can obviously also be selected vice versa. The door-window units 12 are then hinged vice versa according to the above-described embodiment example.

While the present invention has been illustrated by description of various embodiments and while those embodiments have been described in considerable detail, it is not the intention of Applicants to restrict or in any way limit the scope of the appended claims to such details. Additional advantages and modifications will readily appear to those skilled in the art. The present invention in its broader aspects is therefore not limited to the specific details and illustrative examples shown and described. Accordingly, departures may be made from such details without departing from the spirit or scope of Applicants' invention.

What is claimed is:

1. A compaction machine, comprising:
   a machine frame;
   a driver cabin having a right and a left door-window unit when viewed in a traveling direction of the compaction machine, said door-window units being adjustable between a closed and an open position;
   a drive engine; and
   front and rear traveling devices;
   wherein the door-window unit of the right side and the door-window unit of the left side are adjustable from the closed position to the open position at least partially in opposite directions (X) with respect to one another when viewed in the traveling direction.

2. The compaction machine according to claim 1, wherein the driver cabin comprises vehicle pillars on right and left sides of the driver cabin, and that the door-window units are each arranged at a respective vehicle pillar, the door-window unit on one side being arranged at a front vehicle pillar when viewed in the traveling direction and the door-window unit on the other side being arranged at a rear vehicle pillar when viewed in the traveling direction.

3. The compaction machine according to claim 1, wherein the front and rear traveling devices are arranged with an offset transverse to the traveling direction and towards opposite sides and each include a zero side (NR, NL) with one face side sitting flush with one side of the machine frame, and wherein the door-window units are each arranged such that the door-window units can be opened away from the traveling device located on a respective zero side (NR, NL).

4. The compaction machine according to claim 1, wherein the door-window units are mounted at a frame of the driver cabin and/or a vehicle pillar via a door hinge and can swivel between the closed position and the open position.

5. The compaction machine according to claim 1, wherein the door-window units are configured essentially symmetrical with respect to an outer contour of the door-window units.

6. The compaction machine according to claim 1, wherein the door-window units of the right and the left side of the compaction machine are identical in construction.

7. The compaction machine according to claim 1, wherein the door-window units of the right and the left side are arranged at the compaction machine in a centrosymmetrical manner with respect to a horizontal reference plane.

8. The compaction machine according to claim 1, wherein the door-window units each comprise a door element and a window element.

9. The compaction machine according to claim 8, wherein the door element and the window element of a door-window unit comprise at least one of the following features:
   the window element can be opened independently of the door element;
   the window element and the door element open in a same direction;
   the window element and the door element are arranged at the driver cabin and/or the vehicle pillar such that the window element and the door element are each adjustable about a shared swivel axis (D) on one side.

10. The compaction machine according to claim 1, wherein the compaction machine is a rubber-tired roller.

11. A method for operating a compaction machine, according to claim 1, wherein the compaction machine includes a driver cabin with, when viewed in a traveling direction of the compaction a right and a left door-window unit which are each adjustable between a closed and an open position, and front and rear traveling devices which are arranged with an offset transverse to the traveling direction and each include a zero side (NR, NL) towards opposite sides and, with one face side sitting flush with one side of the machine frame on the respective zero side (NR, NL),
   wherein the respective door-window unit located on the respective zero side (NR, NL) is adjusted to the open position against the current traveling direction both in the case of forward as well as backward travels of the compaction machine.

12. A method for manufacturing a compaction machine according to claim 1, wherein an attachment of door-window units to a driver cabin of the compaction machine is performed such that the door-window unit on one side opens in a traveling direction of the compaction machine and the door-window unit on the other side opens against this traveling direction of the compaction machine.

* * * * *